United States Patent [19]

Beane

[11] Patent Number: 4,521,379

[45] Date of Patent: Jun. 4, 1985

[54] ROTARY CALCINING SYSTEM WITH CLEANING MEANS

[75] Inventor: Bennie J. Beane, Wilmington, N.C.

[73] Assignee: General Electric Company, San Jose, Calif.

[21] Appl. No.: 507,561

[22] Filed: Jun. 24, 1983

[51] Int. Cl.³ ............................ B01J 6/00; B01J 8/08

[52] U.S. Cl. ..................................... 422/209; 15/246; 34/85; 34/135; 110/226; 110/246; 222/149; 222/409; 422/159; 422/210; 432/239

[58] Field of Search ...................... 15/246; 34/85, 135, 34/136, 137; 110/226, 246; 222/148, 149, 409; 422/159, 209, 210; 423/19, 253; 432/118, 263, 239

[56] References Cited

U.S. PATENT DOCUMENTS

| | | | |
|---|---|---|---|
| 1,896,020 | 1/1933 | Shimadzu | 422/209 |
| 2,530,403 | 11/1950 | Seaman | 422/209 |
| 2,906,598 | 9/1959 | Googin | 423/261 |
| 3,007,690 | 11/1961 | Koniewiez | 422/209 |
| 3,037,839 | 6/1962 | Googin | 423/261 |
| 3,083,081 | 3/1963 | Sharp | 34/85 |
| 3,279,892 | 10/1966 | Lesser | 422/209 |
| 3,579,311 | 5/1971 | McCoy | 423/261 |
| 3,871,829 | 3/1975 | Keith | 422/233 |
| 3,969,477 | 7/1976 | Keith | 423/253 |
| 4,255,389 | 3/1981 | Jung | 422/209 |
| 4,362,701 | 12/1982 | Kruger | 422/209 |
| 4,439,209 | 3/1984 | Wilwerding | 422/209 |

*Primary Examiner*—Ernest G. Therkorn

*Attorney, Agent, or Firm*—Ivor J. James, Jr.; Raymond G. Simkins; Samuel E. Turner

[57] ABSTRACT

A rotary cylinder calcining system for treating tacky materials with a propensity to adhere to the surfaces of handling apparatus. The system comprises a reciprocating means for freeing the cylinder calciner outlet from any blockages caused by adhering material.

19 Claims, 3 Drawing Figures

ROTARY CALCINING SYSTEM WITH CLEANING MEANS

BACKGROUND OF THE INVENTION

This invention relates to the calcining of materials of a tacky consistency having a propensity for adhering. The invention is particularly directed to rotary cylinder calcining apparatus for calcining "sticky" materials such as ammonium diurnate in the manufacture of uranium dioxide for fissionable fuel used in power generating nuclear reactors.

The present invention comprises an improved calcining apparatus which is useful in manufacturing processes and for producing products of the type described in U. S. Pat. Nos. 2,906,598; 3,037,839; 3,579,311; 3,871,829; and 3,969,477, among other background patents. The disclosure and contents of said patents are therefore incorporated herein by reference. The background of this invention and the state-of-the-art relating thereto are described in some detail in the aforesaid patent disclosure.

This invention applies generally to rotary calcining systems for treating assorted materials of any composition which are of a tacky consistency whereby they exhibit a propensity for adhering to exposed portions or components treating or handling equipment. The invention is specifically applicable to rotary calcining apparatus used in the manufacture of uranium dioxide for use as fissionable fuel in power generation as described in the aforesaid patents.

As is evident from the above cited U.S patents, a common method of producing fuel grade uranium dioxide comprises the hydrolysis of uranium fluoride gas in water to form uranyl fluoride, which material is treated with ammonium hydroxide in solution to precipitate out ammonium diurnate. The ammonium diurnate is then decomposed by heat to uranium dioxide in a calcining operation wherein residual water and any resultant gaseous by-products of the heat treatment are expelled. The consistency of the ammonium diurnate precipitate from this process varies somewhat with respect to the conditions of its formation reactions, for example concentrations and pH of the reacting solutions, temperature, and solution contents such as amounts of fluoride and other possible ingredients of the solutions involved in the process. In any case, the precipitated ammonium diurnate product is typical of a generally viscous and sticky consistency which is prone to adhering or clinging to any surface with which it may contact. In some instances this precipitate has been aptly described as having the consistency of "peanut butter", or a "putty-like sludge".

In accordance with established processes and the procedure in this art, the precipitated ammonium diurnate is partially dewatered by conventional means, and then calcined as described in the above cited U.S. patents. However, the typical tacky consistency of the ammonium diurnate precipitate product and the resultant propensity for its adhering to equipment has created production difficulties and problems which have been unusually costly and cumbersome to cope with in some manufacturing operations. The adherence of such materials very commonly occurs within the confines of the rotary calciner in such critical locations as the restricted area of the outlet therefrom, a portion of the system which is highly prone to blockage and wherein the necessary constant outward flow of solids and gases for continuing production is frequently obstructed.

This problem of adherence and blockage attributable to the tacky consistency of material within fuel producing equipment is especially troublesome and expensive because of the typically inaccessibility of the location of adhering material within a system and the frequency of blockage resulting therefrom, as well as the high temperatures involved within the calcining apparatus. Also, when treating enriched nuclear fuel materials, radiation precautions must be utilized for personnel dealing with the problem.

SUMMARY OF THE INVENTION

This invention comprises a mechanical means for clearing obstructions of adhering material from in and about the outlet portion of a rotary cylinder calciner, and for maintaining such outlet portion free of blockages. The invention includes a unique cleaning plate which is reciprocally moved through the area of reduced cross-section forming the calciner outlet and associated discharge duct.

OBJECTS OF THE INVENTION

It is a primary object of this invention to provide an improved rotary cylinder calciner system which overcomes blockages within a section of the system that is especially susceptible to the occurrence of obstructions, and wherein blockages impede the continuing operation of the system.

It is also an object of this invention to provide means for preventing plugging of the outlet portion of a rotary cylinder calciner regardless of the consistency of the material being treated therein.

It is a further object of this invention to provide an improved rotary calcining system for treating materials of a tacky consistency having a propensity for adhering to the apparatus structure which maintains the system operating free of adhering material and blockages within and about the material flow path through the reduced area comprising the outlet means and channel associated therewith.

It is also a further object of this invention to provide an improved rotary calcining system for treating fissionable nuclear fuel materials which minimize production shutdown time and the need for manual clearing of blockage in areas of difficult access, high heat, and of possible radiation exposure.

DETAILED DESCRIPTION OF THE INVENTION

Figure 1:
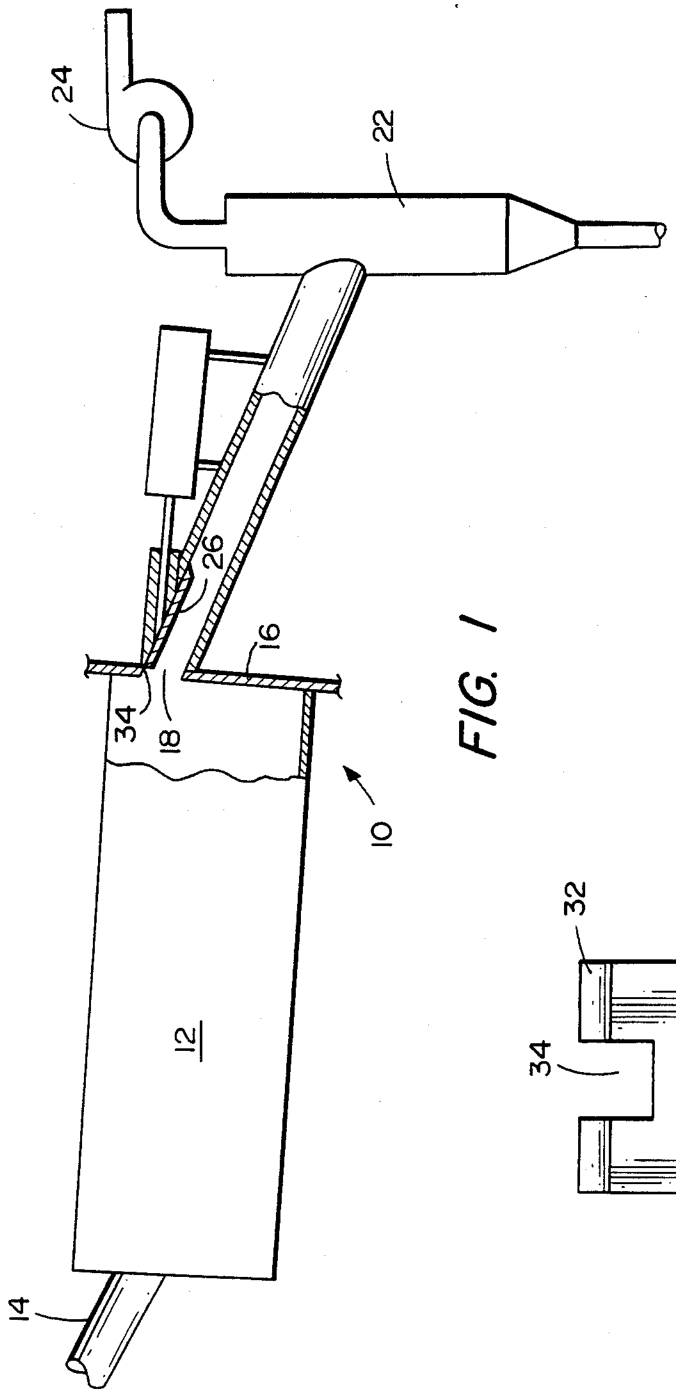
FIG. 1 comprises a perspective view, with parts cut away, of a rotary cylinder calciner system of the types to which this invention applies.
Figure 3:
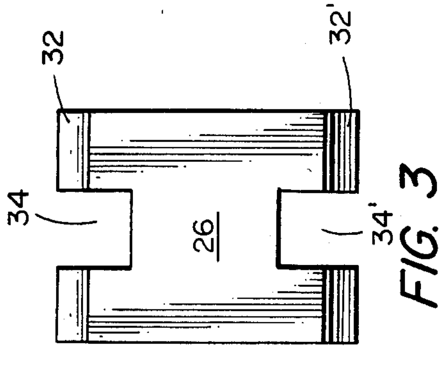
FIG. 3 comprises an illustration of a preferred embodiment for the cleaning plate construction.
Figure 2:
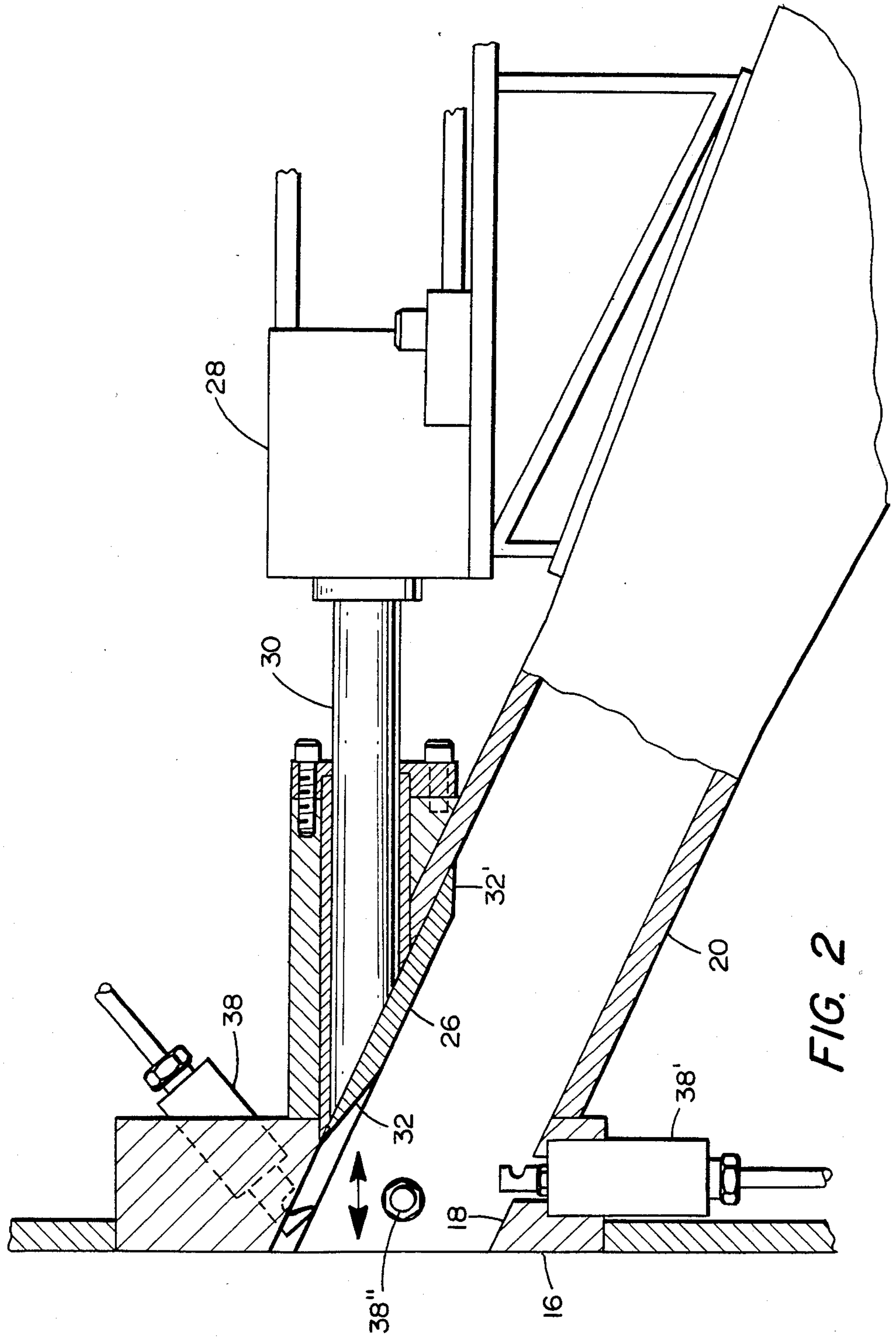
FIG. 2 comprises an enlarged side view of a portion of the system of FIG. 1 comprising the calciner outlet and discharge duct with the means of this invention, shown with parts in half section.

Referring to the drawings, there is shown in FIG. 1 a rotary cylinder calcining system 10, including a rotatable calciner cylinder 12 having an inlet 14 in its upstream end. The downstream end of calciner cylinder 12 is provided with a closure plate forming an end wall 16 for the cylinder which closes off its downstream end.

An outlet port 18 is provided in the end wall 16, and connects with a discharge duct 20 leading away from the port for carrying calcine treated material out from the cylinder calciner 12. Discharge duct 20 may connect with a solids/gas separation 22 for segregating the treated solid material from any gases eminating from the calciner and withdrawn from the system by means of vacuum pump 24. Discharge duct 20 preferably slopes downward and outward from end wall 16 at an acute angle with respect to the longitudinal axis of the calciner cylinder 12.

Depending upon the material undergoing the calcining treatment, and any chemical changes or reaction desired or effected during the calcining, given gaseous reactants or purges, as well as any combustion gases, for heating, may be introduced into the cylinder calciner. For example, as disclosed in U.S. Pat. No. 3,579,311, a heated purge gas such as a mixture of hydrogen, nitrogen and steam is passed through the calciner cylinder. Thus, a vacuum pump, such as pump 24, is frequently utilized to maintain a flow of any such gases through the system, and the exhausting of any introduced or generated gases from within the calciner. A downstream vacuum pump in a closed system as shown, produces a reduced pressure condition within the calciner cylinder as well as through the associated connection which removes any introduced or evolved gases.

In accordance with the invention, the rotary calciner system 10, is provided with a cleaning plate 26 positioned within the discharge duct 20 adjacent to the outlet port 18 in cylinder end plate 16. Cleaning plate 26 is associated with reciprocatable means such as a reciprocation actuating cylinder 28 and a reciprocation drive rod 30 for supporting and reciprocably moving the plate 26. Reciprocation actuating cylinder 28 and drive rod 30 may comprise a fluid driven piston system associated with a suitable source of driving fluid and pressure with manual or automatic controls for appropriate intermitten actuation according to the particular needs of the system and materials acted upon.

In accordance with a preferred embodiment of this invention, the reciprocating actuating cylinder 28 and reciprocating drive rod 30 carrying the cleaning plate 26 mounted thereon, are positioned and arranged in association with the system, and thus operated so as to move the cleaning plate 26 in a reciprocal path from one terminus and base position from entirely within the discharge duct 20, as illustrated, to the other extended terminus position of into and substantially or entirely through the outlet port 18 in end wall 16.

When not in movement along the reciprocal path, the cleaning plate 26 resides in a normal or at rest position at its base terminus of entirely within the discharge duct 20, as illustrated. Cleaning plate 26 is arranged on its mounting at a sloping angle which approximately matches the slope at the discharge duct 20 whereby it adjoins a portion at the duct 20 in close parallel relationship when withdrawn to its base terminus within the duct 20. Thus, when at rest between reciprocating movement, the projection of the cleaning plate into the gas and material flow path through the discharge duct 20 is minimal.

Reciprocally mounted cleaning plate 26, in a preferred embodiment of this invention, is provided with a beveled edge 32—32' in both its leading or forward edge and its trailing or rearward edge as shown in Figure. The beveled edges reduce the resistance of the plate to fluid and solids material flow through the outlet port 18 and in connecting discharge duct 20.

Also in a preferred embodiment, the cleaning plate 26 is provided with one or more cut out or open portions such as the central opening 34—34' in both its leading or forward edge and its trailing or rearward edge. The openings insure that the flow of gas and solid material is never fully obstructed regardless of the plates positioned along its reciprocal path within the system.

Additionally, in a preferred embodiment of this invention, one or more fluid spray devices 38 are aptly deployed so as to direct a wiping fluid spray over the surface of areas of the discharge duct 20 and also cleaning plate 26 to preclude the retention and accumulation of adhering material. For instance, a preferred embodiment comprises four spray devices 38 located within the outlet port 18 and arranged about its perimeter with their spray directed outward therefrom into the discharge duct 20 at appropriate directions whereby one or more fluid sprays wipe clear the surface of the cleaning plate 26 as it moves through its reciprocal path, as well as wiping portions of the duct 20.

Water comprises a suitable spray fluid for the calcining of ammonium diurnate in the manufacture of fuel grade uranium dioxide.

An optimum design for a preferred construction of this invention comprises constructing the outlet port 18 and discharge duct 20 in a rectangular or square cross-sectional configuration whereby the back surface of a rectangular flat cleaning plate 26 with abut and parallel the upper section of the discharge duct 20 as illustrated. Moreover, four spray devices 38 can be aptly deployed in such an arrangement with one located in each of the four sides of the outlet port 18, or adjacent thereto.

What is claimed is:

1. An improved rotary calcining system for calcining materials of a tacky consistency having a propensity for adhering, comprising the combination of a rotary cylinder calciner having a fed inlet in an upstream end and an outlet port in a downstream end wall of the cylinder calciner connected with a discharge duct leading therefrom for carrying material from the cylinder calciner, said combination being provided with a reciprocable cleaning plate located within said discharge duct adjacent to the downstream end wall of the cylinder calciner and the outlet port therein and arranged to reciprocally move forward into and backward out from the outlet port and thereby free said port of any adhering material.

2. The improved rotary calcining system of claim 1, wherein the reciprocable cleaning plate is positioned obliquely to the end wall at the cylinder calciner and the outlet port therein.

3. The improved rotary calcining system of claim 1, wherein the the reciprocable cleaning plate is positioned in approximately the same sloping angle as the discharge duct and when reciprocally moved backward from the outlet port said cleaning plate adjoins a portion of said discharge duct in parallel relationship.

4. The improved rotary calcining system of claim 1, wherein at least one fluid spray means is located about the outlet port and arranged to direct the fluid spray therefrom onto a portion of the cleaning plate when reciprocally moved.

5. An improved rotary calcining system for calcining materials of a tacky consistency having a propensity for adhering, comprising the combination of a rotary cylinder calciner having an upstream fed inlet and a downstream end wall provided with an outlet port connected with a discharge duct leading therefrom for carrying calcined material from the cylinder calciner, said combination being provided with a reciprocable cleaning plate located within said discharge duct adjacent to the calciner outlet port and arranged to reciprocally move from a terminal position within the discharge duct and adjoining a portion of said duct in a generally parallel relationship to an extended opposite terminal position of said cleaning plate projecting substantially through the outlet port to thereby free said port and adjoining portion of the duct of any adhering material.

6. The improved rotary calcining system of claim 5, wherein the reciprocable cleaning plate is positioned obliquely to the downstream end wall of the cylinder calciner and the outlet port therein.

7. The improved rotary calcining system of claim 5, wherein the reciprocable cleaning plate is positioned in approximately the same sloping angle as the discharge duct and when reciprocally moved to the terminus position within the discharge duct, said cleaning plate adjoins a portion of said discharge duct in parallel relationship.

8. The improved rotary calcining system of claim 5, wherein at least one fluid spray means is located within the outlet port and arranged to direct the fluid sprays therfrom onto a portion of the cleaning plate when reciprocally moved.

9. The improved rotary calcining system of claim 5, wherein the cleaning plate is provided with beveled leading and trailing edges to minimize any resistance to calcined material discharging through the outlet port and duct.

10. An improved rotary calcining system for calcining materials of a tacky consistency having a propensity for adhering, comprising the combination of a rotary cylinder calciner having an upstream fed inlet and a downstream end wall provided with an outlet port connected with a discharge duct sloping downward at an acute angle with respect to the axis of the cylinder calciner for carrying calcined material from the cylinder calciner, said combination being provided with a reciprocable cleaning plate located within said discharge duct adjacent to the calciner outlet port and arranged to reciprocally move from a terminal position within the discharge duct and adjoining a portion of said duct in a generally parallel relationship to an extended opposite terminal position of said cleaning plate projecting substantially through the outlet port to thereby free said port and adjoining portion of the duct of any adhering material.

11. The improved rotary calcining system of claim 10, wherein the reciprocable cleaning plate is positioned obliquely to the downstream end wall of the cylinder calciner and outlet port therein.

12. The improved rotary calcining system of claim 10, wherein the reciprocable cleaning plate is positioned in approximately the same sloping angle on the downward sloping discharge duct and when reciprocally moved to the terminal position within the discharge duct, said cleaning plate adjoins a portion of said discharge duct in close parallel relationship.

13. The improved rotary calcining system of claim 10, wherein a plurality of fluid spray means are located about the outlet port and arranged to direct the fluid spray from at least one of said spray means onto a portion of the cleaning plate when reciprocally moved.

14. The improved rotary calcining system of claim 10, wherein the cleaning plate is provided with beveled leading and trailing edges to minimize any resistance to calcined material discharging through the outlet port and duct.

15. An improved rotary calcining system for calcining materials of a tacky consistency having a propensity for adhering, comprising the combustion of a rotary cylinder calciner having an upstream fed inlet and a downstream end wall provided with an outlet port connected to a discharge duct sloping downward at an acute angle with respect to the longitudinal axis of the cylinder calciner, said combination being provided with a reciprocal cleaning plate located within said downward sloping discharge duct adjacent to the calciner outlet port positioned in approximately the same sloping angle as the downward sloping discharge duct and arranged to reciprocally move from a terminal portion within the discharge duct adjoining a portion therein in close parallel relationship to an extended opposite terminal position of said cleaning plate projecting substantially through the outlet port to thereby free said port and adjoining portion of the duct of an adhering material.

16. The improved rotary calcining system of claim 15, wherein at least one fluid spray means is located within the outlet port and arranged to direct the fluid spray therefrom onto a portion of the cleaning plate when reciprocally moved.

17. The improved rotary calcining system of claim 15, wherein the cleaning plate is provided with beveled leading and trailing edges to minimize any resistances to calcined material discharging through the outlet port and duct.

18. The improved rotary calcining system of claim 15, wherein the cleaning plate has a central cutout portion in its leading edge and trailing edge.

19. The improved rotary calcining system of claim 15, wherein the cleaning plate is reciprocally moved by a fluid activated means located external and adjacent to the discharge duct.

* * * * *